(12) United States Patent     (10) Patent No.: US 12,500,995 B2
Zhang et al.     (45) Date of Patent: Dec. 16, 2025

(54) VIDEO DEINTERLACING USING BIDIRECTIONAL TEMPORAL INFORMATION

(71) Applicants: Disney Enterprises, Inc., Burbank, CA (US); ETH Zürich (Eidgenössische Technische Hochschule Zürich), Zürich (CH)

(72) Inventors: Yang Zhang, Dübendorf (CH); Zhaowei Gao, Zürich (CH); Mingyang Song, Zürich (CH); Christopher Richard Schroers, Uster (CH)

(73) Assignees: Disney Enterprises, Inc., Burbank, CA (US); ETH Zürich (Eidgenössische Technische Hochschule Zürich), Zurich (CH)

(*) Notice: Subject to any disclaimer, the term of this patent is extended or adjusted under 35 U.S.C. 154(b) by 0 days.

(21) Appl. No.: 18/890,474

(22) Filed: Sep. 19, 2024

(65) Prior Publication Data

US 2025/0106353 A1    Mar. 27, 2025

Related U.S. Application Data

(60) Provisional application No. 63/585,796, filed on Sep. 27, 2023.

(51) Int. Cl.
*H04N 7/01*       (2006.01)
*G06T 7/246*      (2017.01)

(52) U.S. Cl.
CPC ............... *H04N 7/01* (2013.01); *G06T 7/246* (2017.01); *G06T 2207/20212* (2013.01)

(58) Field of Classification Search
CPC .......... H04N 7/01; H04N 7/012; H04N 7/014; H04N 7/0137; G06T 2207/20212; G06T 7/246
USPC ........ 348/441, 446, 448, 451, 452, 458, 459
See application file for complete search history.

(56) References Cited

U.S. PATENT DOCUMENTS 8,351,510 B1 * 1/2013 Masterson ................ G06T 5/70
                                                                             382/236

OTHER PUBLICATIONS

Haichao Zhu, Xueting Liu, Xiangyu Mao, and Tien-Tsin Wong, "Real-time Deep Video Deinterlacing", Aug. 1, 2017, 9 pgs.

(Continued)

*Primary Examiner* — Sherrie Hsia
(74) *Attorney, Agent, or Firm* — Kwan & Olynick LLP

(57) ABSTRACT

In some embodiments, a method receives a video including interlaced frames. Second fields for a second frame and the second fields for a third frame are analyzed to determine estimated second fields for the first frame in an image space. The method converts the first fields and the estimated second fields for the first frame into first features and second features, respectively, in a feature space. The estimated second features are determined for the estimated second fields for the first frame based on the first features for the first frame. Backward features from the second frame and forward features from the third frame are used to determine the estimated second features for the first frame. The method outputs a prediction for the estimated second fields for the first frame based on the estimated second features and generates a first frame with the first fields and estimated second fields.

20 Claims, 7 Drawing Sheets

(56) References Cited

OTHER PUBLICATIONS

Jifeng Dai, Haozhi Qi, Yuwen Xiong, Yi Li, Guodong Zhang, Han Hu, and Yichen Wei, "Deformable Convolutional Networks", In Proceedings of the IEEE International Conference on Computer Vision, pp. 764-773, 2017.

Jingyun Liang, Jiezhang Cao, Yuchen Fan, Kai Zhang, Rakesh Ranjan, Yawei Li, Radu Timofte, and Luc Van Gool, "VRT: A Video Restoration Transformer", IEEE Transactions on Image Processing, vol. 33, Mar. 7, 2024.

Kelvin CK Chan, Shangchen Zhou, Xiangyu Xu, and Chen Change Loy, "Basicvsr++: Improving Video Super-Resolution with Enhanced Propagation and Alignment", In Proceedings of the IEEE/CVF Conference on Computer Vision and Pattern Recognition, pp. 5972-5981, 2022.

Liangyu Chen, Xiaojie Chu, Xiangyu Zhang, and Jian Sun, "Simple Baselines for Image Restoration", In European Conference on Computer Vision, pp. 17-33. Springer, Aug. 1, 2022.

Michael Bernasconi, Abdelaziz Djelouah, Sally Hattori, and Christopher Schroers, "Deep Deinterlacing", In SMPTE Annual Technical Conf. Exhibition, 2020, 12 pgs.

Mingyang Song, Yang Zhang, Tunç O Aydin, Elham Amin Mansour, and Christopher Schroers,. "A Generative Model for Digital Camera Noise Synthesis", arXiv preprint arXiv:2303.09199, Jun. 13, 2024, 18 pgs.

Yang Zhao, Wei Jia, and Ronggang Wang, "Rethinking Deinterlacing for Early Interlaced Videos", IEEE Transactions on Circuits and Systems for Video Technology, vol. 32, No. 7, Jul. 2022, 7 pgs.

Mn-Chen Yeh, Jilyan Dy, Tai-Ming Huang, Yung-Yao Chen, and Kai-Lung Hua. "VDNet: video deinterlacing network based on coarse adaptive module and deformable recurrent residual network", Neural Computing and Applications, 34(15):12861-12874, Mar. 24, 2022.

Yuqing Liu, Xinfeng Zhang, Shanshe Wang, Siwei Ma, and Wen Gao, "Spatial-Temporal Correlation Learning for Real-Time Video Deinterlacing", In 2021 IEEE International Conference on Multimedia and Expo (ICME), pp. 1-6. IEEE, 2021.

* cited by examiner

VIDEO DEINTERLACING USING BIDIRECTIONAL TEMPORAL INFORMATION

CROSS REFERENCE TO RELATED APPLICATIONS

Pursuant to 35 U.S.C. § 119 (e), this application is entitled to and claims the benefit of the filing date of U.S. Provisional App. No. 63/585,796 filed Sep. 27, 2023, entitled "VIDEO DEINTERLACING USING BIDIRECTIONAL MULTI-SCALE SPATIAL-TEMPORAL INFORMATION PROPAGATION AND ALIGNMENT", the content of which is incorporated herein by reference in its entirety for all purposes.

BACKGROUND

Interlaced video originated from the limitations of early television and display technologies. Interlaced video was developed as a solution to balance visual quality and technical constraints within the available bandwidth and refresh rates. Interlaced video content is captured line by line as scanlines. Within each frame, the even-numbered fields (e.g., scanlines) are captured in one frame, and the odd-numbered fields are captured in the following frame. During playback or display, the captured even and odd fields are alternately displayed on the screen. This results in two consecutive frames being combined into a single interlaced frame, where odd fields come from the first frame and even fields come from the next frame. The process happens quickly such that the human eye perceives the two fields as one continuous frame. This is called "Interlaced scanning".

While interlacing was once a useful technique, some modern displays may require progressive video, which requires full frames. However, in the past, when using interlacing of videos, the original frames may not have been preserved. Consequently, the missing fields for frames are not available. Deinterlacing may be used to restore the missing information in legacy video content.

BRIEF DESCRIPTION OF THE DRAWINGS

The included drawings are for illustrative purposes and serve only to provide examples of possible structures and operations for the disclosed inventive systems, apparatus, methods and computer program products. These drawings in no way limit any changes in form and detail that may be made by one skilled in the art without departing from the spirit and scope of the disclosed implementations.

DETAILED DESCRIPTION

Figure 1:
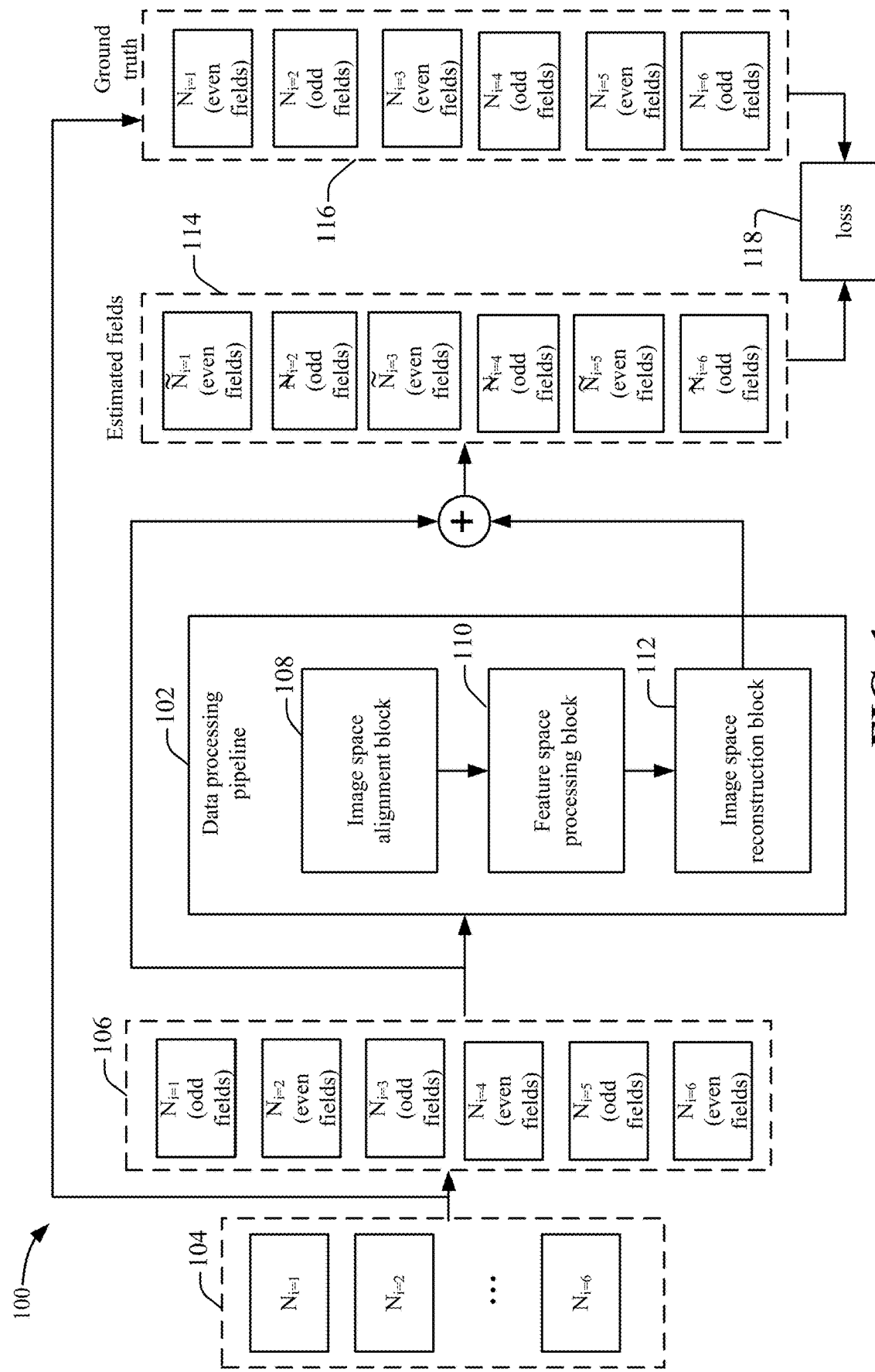
FIG. 1 depicts a simplified system for deinterlacing of interlaced video according to some embodiments.

Described herein are techniques for a video processing system. In the following description, for purposes of explanation, numerous examples and specific details are set forth to provide a thorough understanding of some embodiments. Some embodiments as defined by the claims may include some or all the features in these examples alone or in combination with other features described below, and may further include modifications and equivalents of the features and concepts described herein.

System Overview

A system performs deinterlacing of interlaced video. Interlaced videos may be incompatible with some current display screens. To display interlaced videos on some display screens, the process of deinterlacing becomes necessary. Deinterlacing involves estimating the content of absent fields (e.g., lines) within the fields of an interlaced video signal, aiming to generate a complete frame of fields. Deinterlacing converts interlaced video sequences into a progressive scan format.

The process uses temporal information to perform the deinterlacing. A system may use sequences of frames, such as six consecutive frames, with frames including either odd fields or even fields. The input order for the fields may be odd fields from the first frame, even fields from the second frame, and then alternates between odd and even fields for the subsequent frames. The output is an estimation of the missing fields. Specifically, the system may predict the even fields for the first frame, the odd fields for the second frame, and the even fields for the third frame, and so on. The odd fields and the even fields for a frame may be combined to generate a frame with both the odd fields and the even fields, which can be used in progressive scan video systems.

Deinterlacing may be highly challenging. The difficulty lies in the need to aggregate information between multiple highly correlated but unaligned frames in a video sequence. Therefore, alignment and propagation of temporal sequence information is important. In the alignment part, the present system combines image alignment in an image space and feature alignment in a feature space, where alignment is performed at different scales. The use of alignment in the two different spaces may improve the deinterlacing. The alignment in the image space may reduce interlacing artifacts. Also, for additional alignment of fields, the feature space is used to propagate temporal information and align the fields.

In terms of temporal information propagation, a previously used unidirectional propagation transmits temporal information from the first frame to the next frame in the video sequence. However, in this scenario, the information received by different frames is unbalanced. Specifically, the first frame receives no information from the video sequence except itself, whereas the last frame receives information from the previous frame or frames. Therefore, each frame receives a limited amount of information, which may result in sub-optimal outcomes. To deal with this, the system uses a bidirectional information propagation scheme to propagate temporal information in the image space and also the feature space. For example, instead of propagating temporal information in one direction, such as from the first frame to the second frame, from the second frame to the third frame, and so on, the temporal information may be propagated in both directions. For example, a frame #2 may receive temporal information from frame #1 and also frame #3. The temporal information may be used to predict an estimation of the missing fields. The result of the prediction may restore the original frames while removing complex interlacing artifacts. This conversion method helps mitigate visual artifacts in interlaced videos, and aligns the content with the expectations of display screen technologies.

System

FIG. 1 depicts a simplified system 100 for deinterlacing of interlaced video according to some embodiments. A data processing pipeline 102 includes image space alignment block 108, feature space processing block 110, and image space reconstruction block 112. The prediction of missing fields may use temporal information from correlated frames to estimate the missing fields. The video sequences may include moving objects that may make the estimation difficult. The system uses propagation of temporal information in the image space and the feature space to align and refine the estimation of missing fields to improve the estimation.

Image space alignment block 108 may be performed in the image space. The image space is based on a pixel-level representation of the frames of the video. Each pixel in an image has associated values for different channels (e.g., intensity, color). The alignment may determine temporal information (e.g., optical flow) in the image space from temporally correlated fields. Correlated fields may be corresponding fields in adjacent frames. For example, a first field (e.g., pixel) in an odd line in a first frame may correspond to a second field in the even line of a previous frame and a third field in the even line of a next frame. The temporal information may be the estimation of motion of pixels in adjacent frames. The temporal information is used to align the information to estimate missing fields for a frame in the image space. For example, an item may be moving in the video. The even fields in the frames before or after the current frame may include information that has moved. To predict the even field in the current frame, the even fields in the adjacent frames may be aligned (e.g., warped or altered) using temporal information to predict the even fields in the current frame. Image space alignment block 108 will be described in more detail at least in FIG. 3.

Feature space processing block 110 may be performed in the feature space. The feature space may be a transformed representation of the image data. The features may represent characteristics of the fields, such as edges, motion, texture, etc. The feature space is different than the image space in that the image space refers to the pixel values and spatial layout of the fields and the feature space represents abstracted characteristics derived from the image. The features for missing fields for a frame are aligned and refined using bidirectionally propagated temporal information in the feature space. This process is described in more detail at least in FIG. 4.

Image space reconstruction block 112 may reconstruct a residual of a difference between the original fields and the predicted fields from the feature space to the predicted missing fields in image space. This results in predicted missing fields in the image space that can be combined with the existing fields for the interlaced video to form a full frame with odd fields and even fields. This process is described in more detail at least in FIG. 6.

The following will describe one process of estimating fields and a training process for data processing pipeline 102. In some embodiments, at 104, data processing pipeline 102 may process six frames at once in a batch, such as six consecutive frames from the interlaced video. However, other numbers of frames may be processed. At 104, six original frames may be used. These frames may be labeled as "N", and the frame number is identified by "i" as in i=1, i=2, ..., i=6. The frames include both the even fields and the odd fields. In the training process, the original frames are used, but in an inference stage, the interlaced video without the full frame information may be used.

At 106, frames may include odd fields or even fields. For example, frame i=1 includes odd fields, frame i=2 includes even fields, frame i=3 includes odd fields, and so on. The objective of data processing pipeline 102 is to predict an estimation of the missing fields of the frame. For example, if the first frame includes odd fields, then the prediction may estimate the even fields for the first frame. Similarly, if the second frame includes even fields, then the prediction estimates the odd fields for the second frame. The output from image space reconstruction block 112 may be different types of information. For example, the output of image space reconstruction block 112 may be the changes (e.g., residual) from the known fields of the frame to arrive at the missing fields of the frame. Then, the known fields and the changes may be combined to determine the missing fields of the frame. In other embodiments, the missing fields may be estimated directly without any need for a combination. The prediction of the residual may use less data and be computed more efficiently in some embodiments. For example, the first frame includes the odd fields at 106. The changes from the odd fields may be output by image space reconstruction block 112. Combining the odd fields and the changes to the odd fields results in the even fields for the first frame. At 114, the estimations for missing fields for respective frames are shown, such as for frame i=1, the even fields are estimated, for frame i=2, the odd fields are estimated, for frame i=3, the even fields are estimated, and so on. For the frames, the odd fields and the even fields may be combined to generate frames with odd fields and even fields.

A training process may be performed to train the parameters of data processing pipeline 102 to perform the functions described herein. For example, at 116, a ground truth is determined using the original frames at 104. For example, for the first frame, the even fields are determined from the original first frame, for the second frame, the odd fields are determined from the original second frame, and so on. Then, a loss between respective fields of the frames may be determined at 118. For example, the estimated even fields for frame i=1 may be compared to the ground truth even fields for frame i=1. The loss may be calculated, and used to adjust the parameters of data processing pipeline 102 to minimize the loss. Training results in data processing pipeline 102 being trained to output predictions to deinterlace video frames.

Figure 2:
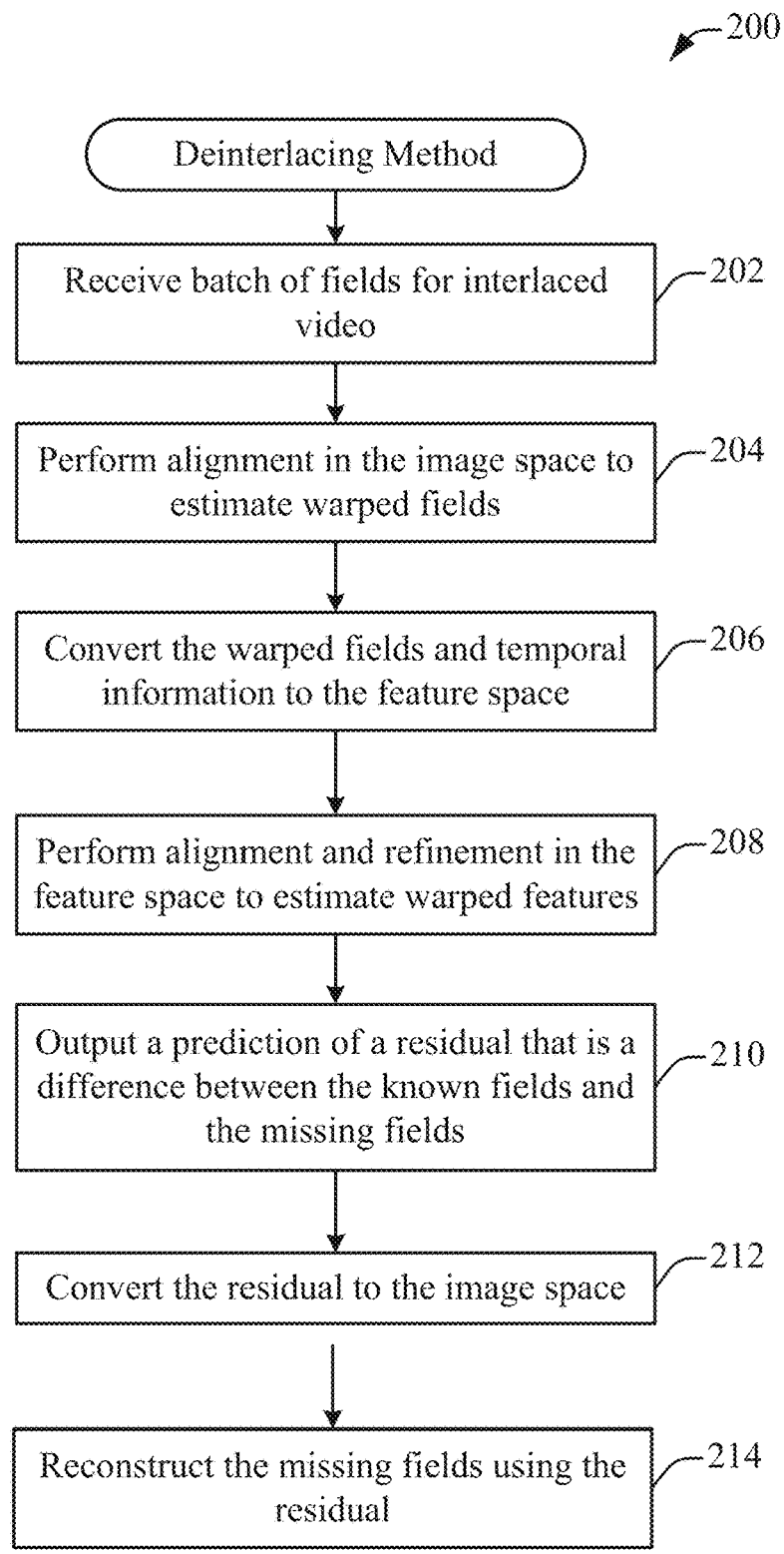
FIG. 2 depicts a simplified flowchart of a method for performing deinterlacing according to some embodiments.

FIG. 2 depicts a simplified flowchart 200 of a method for performing deinterlacing according to some embodiments. At 202, data processing pipeline 102 receives a batch of fields for interlaced video. For example, the fields may include a first frame with odd fields, a second frame with even fields, a third frame with odd fields and so on, where consecutive frames alternate between even and odd fields.

At 204, data pipeline processing pipeline 102 performs alignment in the image space to estimate warped fields. The warped fields may be the fields of the correlated frames and motion found in the video. Image space alignment block 108 may estimate temporal information, which may estimate motion between frames. For example, the optical flow may be estimated between a pair of fields in neighboring frames in both the forward and backwards directions. The temporal flow may be determined between a field in frame i and frame i−1 and the field in frame i and frame i+1. Then, image space alignment block 108 may perform a forward and backwards alignment of fields in the image domain to determine warped fields. For example, the even fields in frame i+1 may have moved slightly from the original even fields in frame i. The temporal information is determined for a field for frame i that represents the change from the even fields of frame i+1. The warped field may be the even field and temporal information for the even field. A similar alignment is performed using the even fields of frame i−1. The combined alignment results in a warped field for the known fields of a frame. Conceptually, the first frame includes odd fields, the warped fields may be warped odd fields, which may estimate even fields of the first frame.

At 206, data processing pipeline converts the warped fields and temporal information to the feature space. For example, a convolutional layer is applied to extract features of the warped fields. At 208, data processing pipeline 102 performs alignment and refinement in the feature space to estimate warped features. The warped features may be estimated using bidirectional temporal information from adjacent fields to align and refine the features to the warped features.

At 210, data processing pipeline 102 outputs a prediction of a residual that is a difference between the known fields and the missing fields. For example, the residual may be a difference between the known odd fields and the warped fields (e.g., estimated even fields) in the feature space. At 212, data processing pipeline 102 converts the residual to the image space. Then, at 214, data processing pipeline 102 reconstructs the missing fields using the residual. For example, the residual may be combined with the known fields to determine the missing fields, such as if the odd fields are known, the even fields are determined by applying the residual to the odd fields.

The following will now describe image space alignment block in more detail.

Image Space Alignment Block

Figure 3:
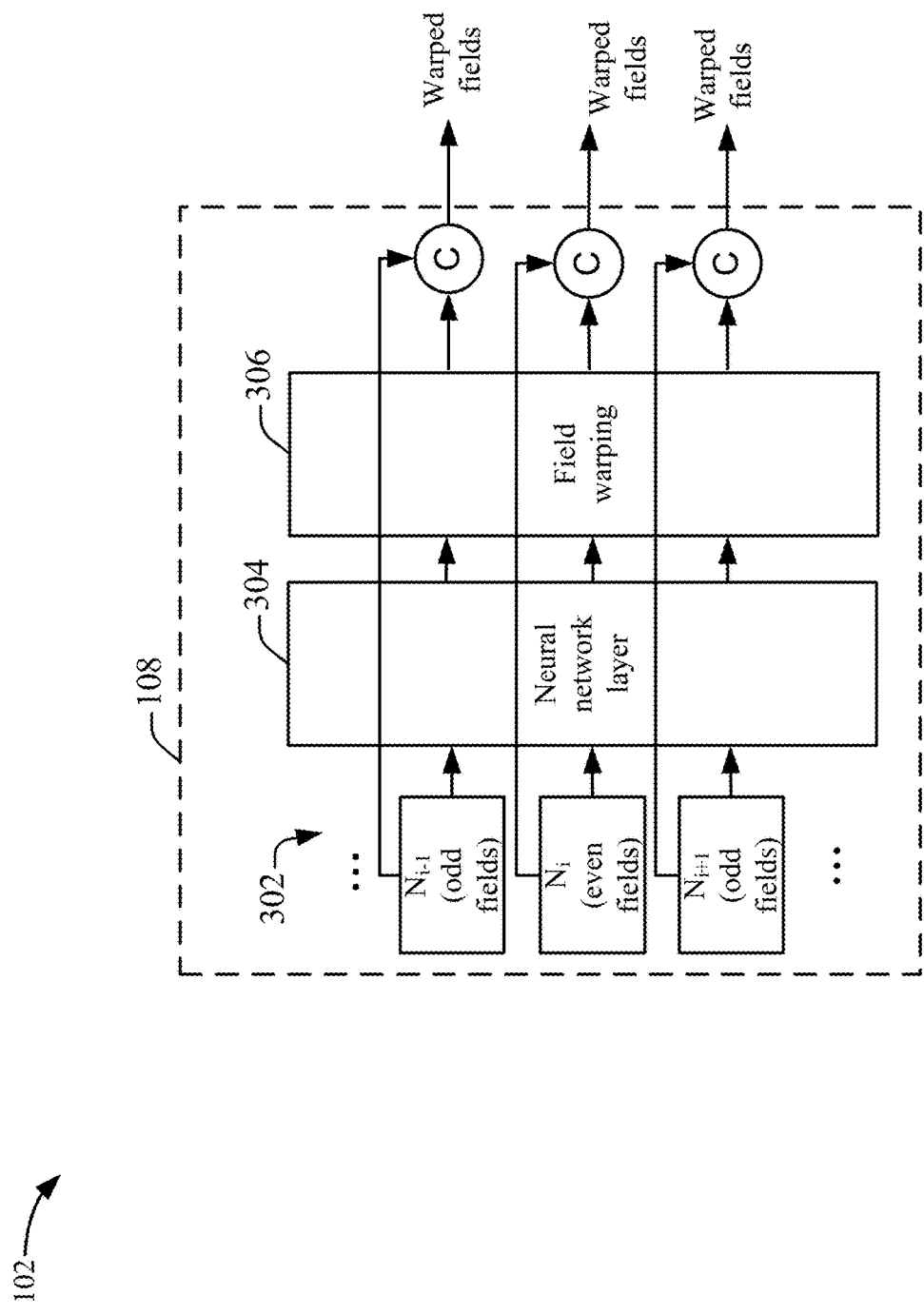
FIG. 3 depicts a more detailed example of an image space alignment block in a data processing pipeline according to some embodiments.

FIG. 3 depicts a more detailed example of image space alignment block 108 in data processing pipeline 102 according to some embodiments. At 302, fields for frames are input into a neural network 304 in image space alignment block 108. Three frames are shown, which are labeled as frames N with i representing the frame number, such as frame $N_{i-1}$, frame $N_i$, and frame $N_{i+1}$. This represents three consecutive frames (e.g., frames 3, 4, and 5). Here, frame $N_{i-1}$ includes odd fields, frame $N_i$ includes even fields, and frame $N_{i+1}$ includes odd fields. Although three frames are shown, other numbers of frames may be processed.

A neural network layer 304 may compute the temporal information of respective fields. For example, the temporal information may be the optical flow of motion between the fields. Neural network 304 may include convolutional neural networks (CNNs) that may operate at different resolutions to refine the optical flow estimation from a course estimate to a finer estimate. For example, the odd fields of frame $N_{i-1}$ may be compared to the even fields of $N_i$ to estimate the motion between the fields.

A field warping 306 may determine warped fields by performing a forward alignment and backwards alignment of adjacent fields in the image space in different channels. Channels may be different values for pixels, such as intensity, color, etc. The spatial alignment may be performed at different scales, such as four different scales, with the respective optical flow at the respective scale. This results in four pairs of forward warped fields and backwards warped fields. The original image fields $N_i$, the four pairs of forward warped fields and backwards warped fields (e.g., the adjacent fields and the respective temporal information for optical flows) are concatenated along the channel dimension. The concatenation result is sent as input into feature space processing block 110.

Feature Space Processing Block

Figure 4:
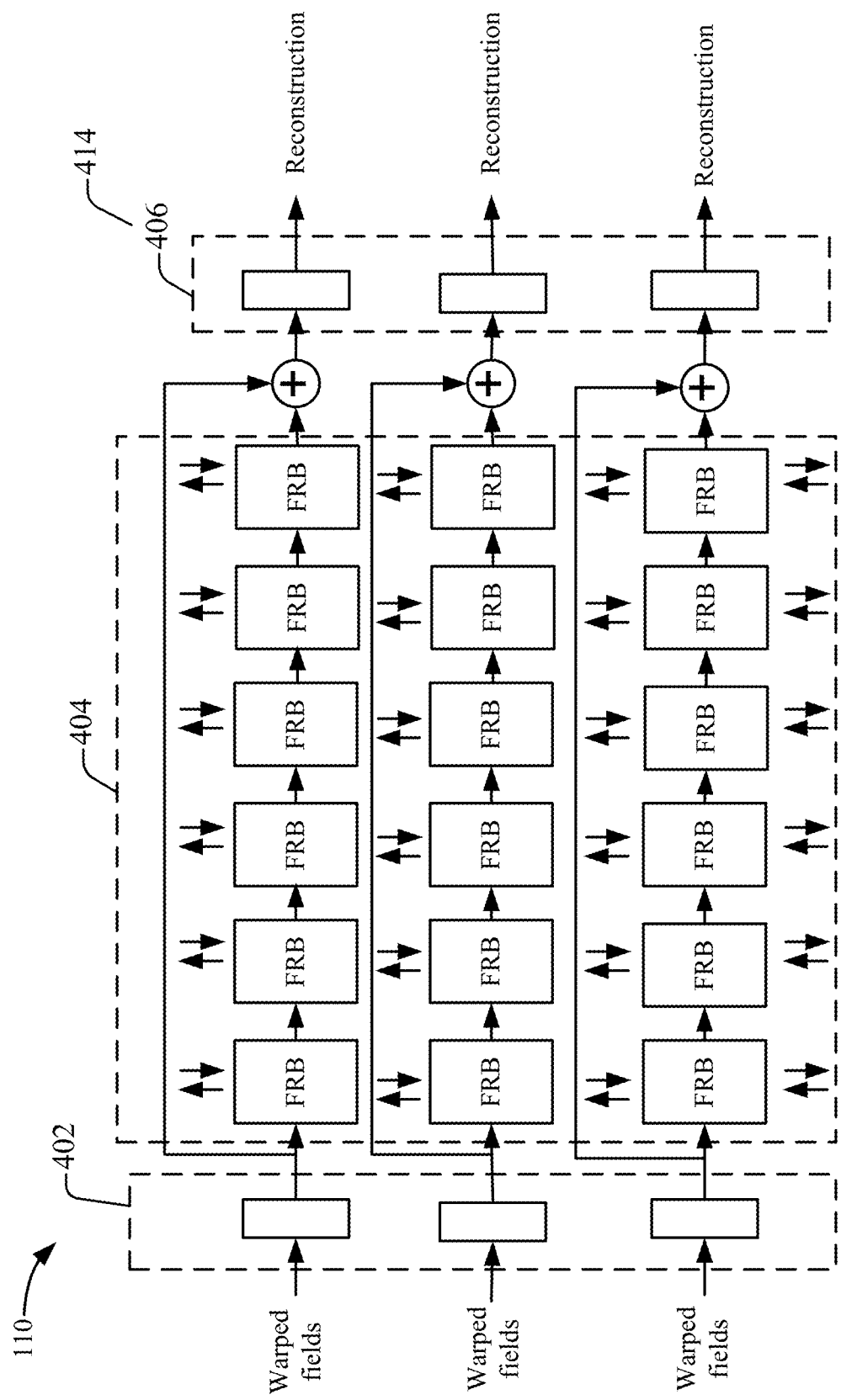
FIG. 4 depicts a more detailed example of a feature space processing block according to some embodiments.

FIG. 4 depicts a more detailed example of feature space processing block 110 according to some embodiments. Feature space processing block 110 may receive the warped fields and aligns, refines, and propagates the warped fields in the feature space using the optical flow from the image space. Feature space processing block 110 determines a residual that represents a difference between the original fields and the estimated missing fields.

In feature space processing block 110, a convolution layer 402 receives the output from image space alignment block 108. Convolution layer 402 may be a three dimensional (3D) convolutional layer that extracts image features in the feature space from the input. For example, the features from the original fields and the warped fields are extracted. The features may then be analyzed in a propagation layer 404 where alignment and refinement are performed in the feature space using flow guided refinement blocks (FRB). As shown, each field may be processed through a series of flow guided refinement blocks where flow guided refinement blocks may process different scales of the field. In some embodiments, the following scales may be used, such as scales of HW [height, width], H/2 W/2, H/4 W/4, H/8 W/8, but other scales may be used. The features may be downsampled from HW to H/8, W/8, and then upsampled from H/8, W/8 to HW.

Each flow guided refinement block may use forward feature propagation and backwards feature propagation. For example, forward feature propagation may use features from fields in a previous frame (i−1) and backwards propagation may use features from fields in a next frame (i+1). The forward propagation features and backwards propagation features are used to align and refine the features that are estimated for the respective warped fields. The output of the series of flow guided refinement blocks may be the estimated warped fields for the respective fields. The estimated warped fields is then combined with the original input (e.g., in an element-wise addition operation) to determine a residual. The residual may be the difference between the original field and the missing field. The residual is output to a convolutional layer 406. Convolutional layer 406 may convert the residual to the image space. Then, reconstruction can be performed to reconstruct the missing fields, which will be discussed later in more detail.

The flow guided refinement block will now be described in more detail.

Flow Guided Refinement Block

Figure 5:
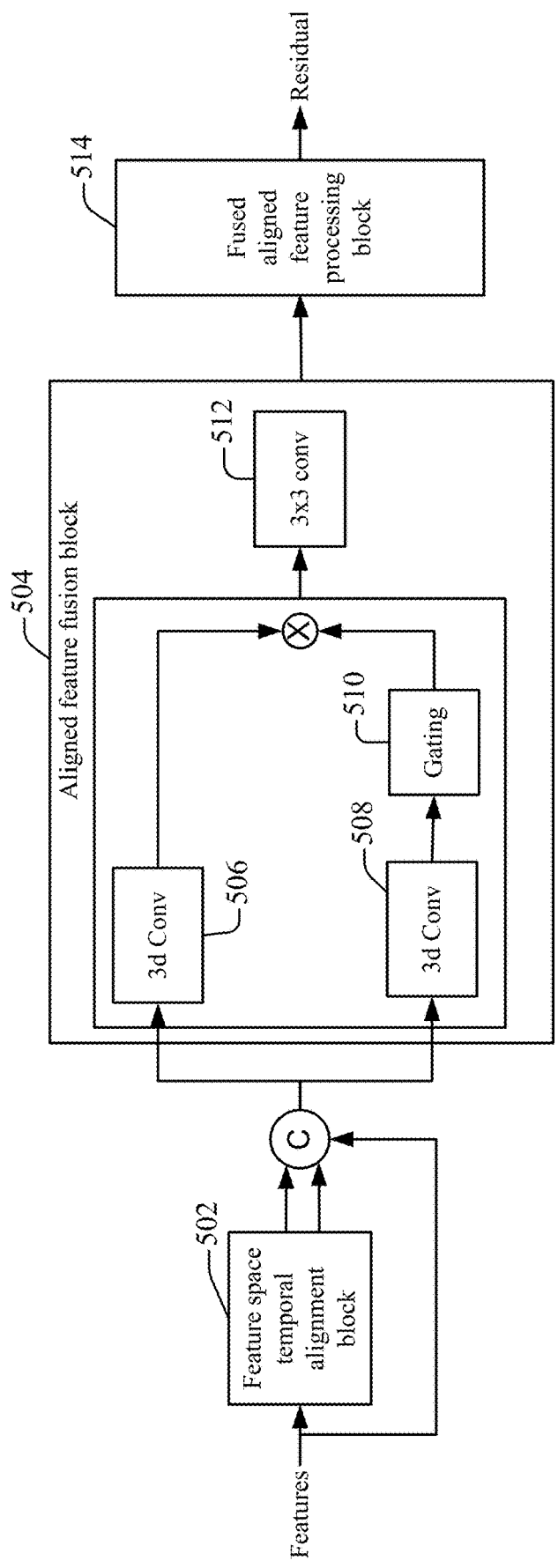
FIG. 5 depicts a more detailed example of flow guided refinement block according to some embodiments.

FIG. 5 depicts a more detailed example of flow guided refinement block according to some embodiments. In the flow guided refinement block, a feature space temporal alignment block 502 receives input of the original features, the warped features, and the features of the temporal information representing optical flow from the image space. Feature space temporal alignment block 502 may incorporate flow information to enhance the original features and the warped features. The inputs to feature space temporal alignment block 502 may be the current feature at index i, the feature from the previous field i−1 computed from index i−1, and the features from the temporal information to the current field. The feature computed from the index i−1 may be forward warped with the features for the temporal information. The alignment of the forward warped feature may be performed in the feature space using deformable alignment in contrast to the flow-based alignment in the image space. The deformable alignment may estimate different aspects of the motion compared to the flow-based alignment making the alignment more robust. For example, the deformable alignment may use deformable convolution. The temporal information features from the temporal information of the image space may be used to guide the deformable alignment, which may improve the performance. For example, the temporal information features may be used to determine offset diversity while reducing offset overflow. Offset diversity allows convolution operation to adaptively adjust based on the features. Offset overflow may occur when the deformable convolution deforms to attempt to sample features outside of a boundary. The current feature, warped feature, and temporal information may be concatenated and input into deformable convolution layers. Deformable convolution may leverage temporal information from adjacent frames by adaptively shifting sampling points based on learned motion offsets. This allows the model to align features across frames, effectively capturing consistent and relevant temporal context. As a result, the convolutional operation aggregates richer spatial and temporal information, enhancing feature representation. The aligned features are subsequently output for missing fields as a forward propagation of the missing field. The similar process may be performed in the backwards direction between the current feature at index i, the feature from the next field i+1 computed from index i+1, and the features from the temporal information to the current field.

The output of feature space temporal alignment block 502 is the forward propagation of a single field and the backwards propagation of a single field. The forward propagation may be the features from a previous frame to estimate the missing field and the backwards propagation is features from a next frame to estimate the missing field. The original field, the forward propagation, and the backwards propagation may be concatenated and input into an aligned feature fusion block 504. The features from the current scale and from corresponding scales of adjacent fields are then concatenated and aggregated by aligned feature fusion block 504. For example, a 3D convolution 506 is performed. Also, a 3D convolution 508 is performed and a gating operation 510 is performed. The gating operation may weight certain features as being more important. For example, there may be redundant features, which can be down-weighted by the gating. The 3D convolution of the entire features and the weighted features are then combined (e.g., as an element-wise dot product), and then input to a convolution layer 512. The output of aligned feature fusion block 504 is then input into a fused aligned feature processing block 514. Fused aligned feature processing block 514 may refine the features and output the refined features. the current feature at index i, the feature from the previous field i−1 computed from index i−1, and the features from the temporal information to the current field. Rather than directly computing the features of the missing fields, the residual with respect to the estimated missing fields and the input fields is computed. The residual represents a difference of the original fields and the features of the estimated warped fields from the feature space. As discussed above, convolutional layer 406 may convert the residual to the image space.

Reconstruction

Figure 6:
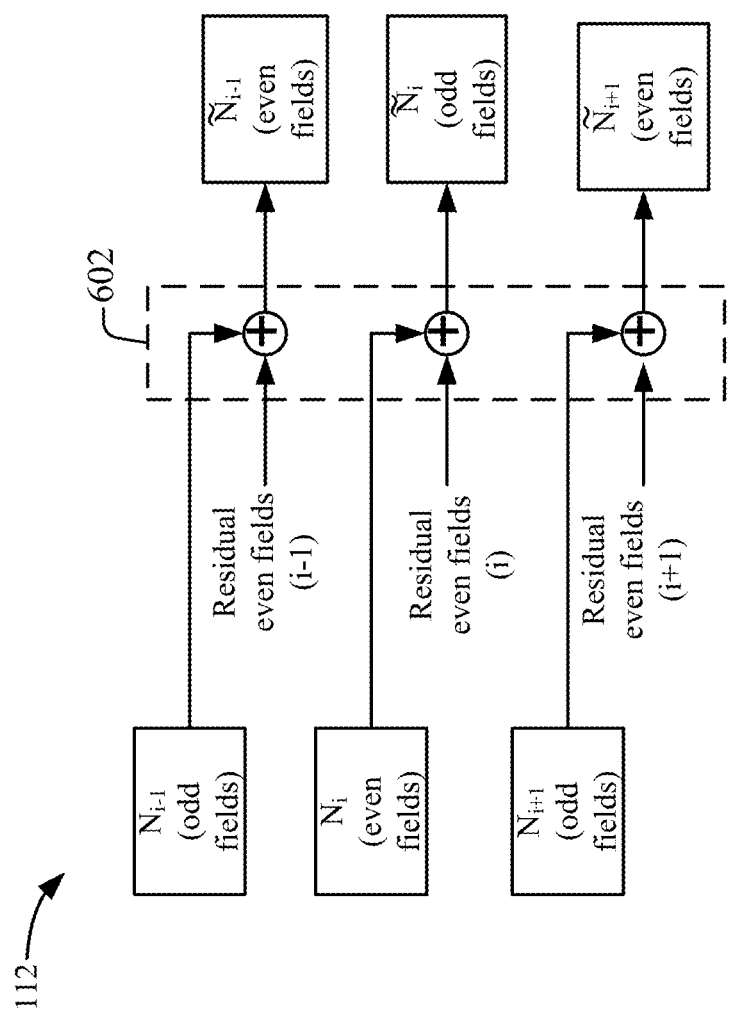
FIG. 6 depicts an example of an image space reconstruction block according to some embodiments.

FIG. 6 depicts an example of image space reconstruction block 112 according to some embodiments. Following the feature refinement, image space reconstruction block 112 receives the reconstructed residual in the image space. A combination layer 602 combines the residual with the respective fields. For example, the residual may be the estimation of the changes of the respective fields to estimate the missing fields. For input frame i−1, the odd fields are found. The residual from the odd fields and the odd fields are combined to reconstruct the estimation of the even fields for the input frame i−1. Similarly, the odd fields are estimated for frame i and the even fields are estimated for the frame i+1. This results in each frame including the original odd fields and the estimated even fields or the original even fields and the estimated odd fields.

CONCLUSION

Accordingly, the missing fields may be estimated using the deinterlacing process. The use of the image space and the feature space improves the estimation by performing the estimation in different spaces. Also, the bidirectional alignment that is performed also improves the estimation by using forward and backwards propagation of optical flows in the image space and forward feature information propagation and backwards feature information propagation in the feature space.

System

Figure 7:
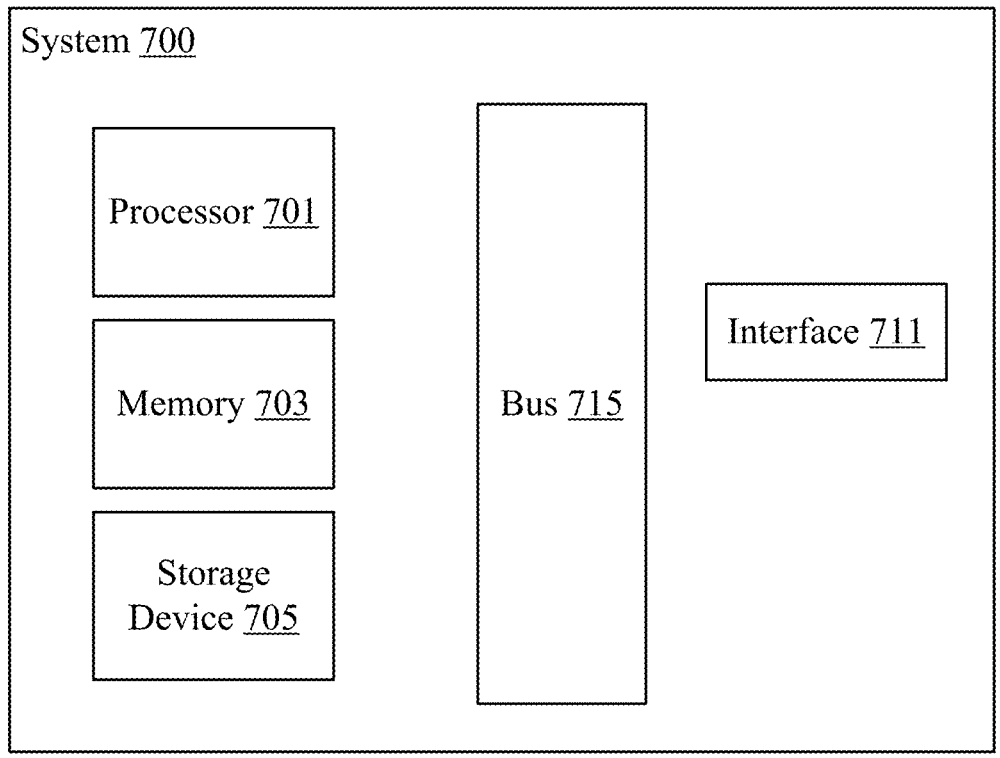
FIG. 7 illustrates one example of a computing device according to some embodiments.

FIG. 7 illustrates one example of a computing device according to some embodiments. According to various embodiments, a system 700 suitable for implementing embodiments described herein includes a processor 701, a memory module 703, a storage device 705, an interface 711, and a bus 715 (e.g., a PCI bus or other interconnection fabric). Although a particular configuration is described, a variety of alternative configurations are possible. The processor 701 may perform operations such as those described herein. Instructions for performing such operations may be embodied in the memory 703, on one or more non-transitory computer readable media, or on some other storage device. Various specially configured devices can also be used in place of or in addition to the processor 701. Memory 703 may be random access memory (RAM) or other dynamic storage devices. Storage device 705 may include a non-transitory computer-readable storage medium holding information, instructions, or some combination thereof, for example instructions that when executed by the processor 701, cause processor 701 to be configured or operable to perform one or more operations of a method as described herein. Bus 715 or other communication components may support communication of information within system 700. The interface 711 may be connected to bus 715 and be configured to send and receive data packets over a network. Examples of supported interfaces include, but are not limited to: Ethernet, fast Ethernet, Gigabit Ethernet, frame relay, cable, digital subscriber line (DSL), token ring, Asynchronous Transfer Mode (ATM), High-Speed Serial Interface (HSSI), and Fiber Distributed Data Interface (FDDI). These interfaces may include ports appropriate for communication with the appropriate media. They may also include an independent processor and/or volatile RAM. A computer system or computing device may include or communicate with a monitor, printer, or other suitable display for providing any of the results mentioned herein to a user.

Any of the disclosed implementations may be embodied in various types of hardware, software, firmware, computer readable media, and combinations thereof. For example, some techniques disclosed herein may be implemented, at least in part, by non-transitory computer-readable media that include program instructions, state information, etc., for configuring a computing system to perform various services and operations described herein. Examples of program instructions include both machine code, such as produced by a compiler, and higher-level code that may be executed via an interpreter. Instructions may be embodied in any suitable language such as, for example, Java, Python, C++, C, HTML, any other markup language, JavaScript, ActiveX, VBScript, or Perl. Examples of non-transitory computer-readable media include, but are not limited to: magnetic media such as hard disks and magnetic tape; optical media such as flash memory, compact disk (CD) or digital versatile disk (DVD); magneto-optical media; and other hardware devices such as read-only memory ("ROM") devices and random-access memory ("RAM") devices. A non-transitory computer-readable medium may be any combination of such storage devices.

In the foregoing specification, various techniques and mechanisms may have been described in singular form for clarity. However, it should be noted that some embodiments include multiple iterations of a technique or multiple instantiations of a mechanism unless otherwise noted. For example, a system uses a processor in a variety of contexts but can use multiple processors while remaining within the scope of the present disclosure unless otherwise noted. Similarly, various techniques and mechanisms may have been described as including a connection between two entities. However, a connection does not necessarily mean a direct, unimpeded connection, as a variety of other entities (e.g., bridges, controllers, gateways, etc.) may reside between the two entities.

Some embodiments may be implemented in a non-transitory computer-readable storage medium for use by or in connection with the instruction execution system, apparatus, system, or machine. The computer-readable storage medium contains instructions for controlling a computer system to perform a method described by some embodiments. The computer system may include one or more computing devices. The instructions, when executed by one or more computer processors, may be configured or operable to perform that which is described in some embodiments.

As used in the description herein and throughout the claims that follow, "a", "an", and "the" include plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of some embodiments may be implemented. The above examples and embodiments should not be deemed to be the only embodiments and are presented to illustrate the flexibility and advantages of some embodiments as defined by the following claims. Based on the above disclosure and the following claims, other arrangements, embodiments, implementations, and equivalents may be employed without departing from the scope hereof as defined by the claims.

What is claimed is:

1. A method comprising:
   receiving a video including interlaced frames, wherein the interlaced frames include a first frame with first fields from original frames of the video, a second frame and a third frame with second fields from original frames of the video;
   analyzing the second fields for the second frame to determine first information and the second fields for the third frame to determine second information, wherein the first information and the second information are for estimated second fields for the first frame in an image space;
   converting the first fields, the first information, and the second information into first features, second features, and third features, respectively, in a feature space;
   refining the first features, the second features, and the third features in the feature space to determine refined first features, refined second features, and refined third features;
   outputting a prediction for the estimated second fields for the first frame based on the refined first features, refined second features, and refined third features; and
   using the prediction to generate a first frame with the first fields and estimated second fields.

2. The method of claim 1, wherein:
   the first fields include even rows of pixels from the original frames, and
   the second fields include odd rows of pixels from the original frames.

3. The method of claim 1, wherein:
   the first frame includes even rows of pixels from an original first frame and not odd rows of pixels from the original first frame, and
   the second frame and the third frame include odd rows of pixels from an original second frame and original third frame, respectively, and not the even rows of pixels from the original second frame and the original third frame, respectively.

4. The method of claim 1, wherein analyzing the second fields for the second frame and the second fields for the third frame comprises:
   computing first temporal information based on the second fields for the second frame and second temporal information based on the second fields for the third frame; and
   using the temporal information to determine the first information and using the second temporal information to determine the second information.

5. The method of claim 4, wherein computing the first temporal information and the second temporal information comprises:
   estimating motion in an optical flow between the first fields of the first frame and the second fields for the second frame to determine the first temporal information using a prediction network; and
   estimating motion in an optical flow between the first fields of the first frame and the second fields for the third frame using the prediction network.

6. The method of claim 4, wherein using the temporal information comprises:
   combining the second fields for the second frame and respective temporal information into the first information; and
   combining the second fields for the third frame and respective temporal information into the second information.

7. The method of claim 6, further comprising:
   converting the second fields for the second frame and respective temporal information, the first fields, and the second fields for the third frame and respective temporal information to the feature space.

8. The method of claim 1, wherein converting the first fields, the first information, and the second information comprises:
converting the first fields, the first information, and the second information in the image space to the feature space using a prediction network.

9. The method of claim 1, wherein refining the first features, the second features, and the third features comprises:
refining the first features, the second features, and the third features using a plurality of blocks, wherein the plurality of blocks analyze the refining the first features, the second features, and the third features in different scales.

10. The method of claim 1, wherein refining the first features, the second features, and the third features comprises:
determining temporal information features from the image space for the second frame and the third frame; and
using the temporal information features to refine the first features, the second features, and the third features.

11. The method of claim 10, wherein refining the first features, the second features, and the third features comprises:
concatenating the first features, the second features, and the third features with the temporal information features to generate concatenated features; and
applying weights to features in the concatenated features based on a determined importance of the features to generate weighted concatenated features.

12. The method of claim 11, further comprises:
refining the weighted concatenated features using a prediction network to determine the refined first features, refined second features, and refined third features.

13. The method of claim 1, wherein outputting the prediction comprises:
converting information for the refined first features, refined second features, and refined third features in the feature space to refined first fields, refined second fields, and refined third fields the image space, wherein the refined first fields, refined second fields, and refined third fields are used to generate the estimated second fields for the first frame.

14. The method of claim 1, wherein outputting the prediction comprises:
outputting a residual of a difference between the first fields and the estimated second fields for the first frame, wherein the residual and the first fields of the first frame are used to generate the first frame with the first fields and estimated second fields.

15. A non-transitory computer-readable storage medium having stored thereon computer executable instructions, which when executed by a computing device, cause the computing device to be operable for:
receiving a video including interlaced frames, wherein the interlaced frames include a first frame with first fields from original frames of the video, a second frame and a third frame with second fields from original frames of the video;
analyzing the second fields for the second frame to determine first information and the second fields for the third frame to determine second information, wherein the first information and the second information are for estimated second fields for the first frame in an image space;
converting the first fields, the first information, and the second information into first features, second features, and third features, respectively, in a feature space;
refining the first features, the second features, and the third features in the feature space to determine refined first features, refined second features, and refined third features;
outputting a prediction for the estimated second fields for the first frame based on the refined first features, refined second features, and refined third features; and
using the prediction to generate a first frame with the first fields and estimated second fields.

16. The non-transitory computer-readable storage medium of claim 15, wherein analyzing the second fields for the second frame and the second fields for the third frame comprises:
computing first temporal information based on the second fields for the second frame and second temporal information based on the second fields for the third frame; and
using the temporal information to determine the first information and using the second temporal information to determine the second information.

17. The non-transitory computer-readable storage medium of claim 16, wherein computing the first temporal information and the second temporal information comprises:
estimating motion in an optical flow between the first fields of the first frame and the second fields for the second frame to determine the first temporal information using a prediction network; and
estimating motion in an optical flow between the first fields of the first frame and the second fields for the third frame using the prediction network.

18. The non-transitory computer-readable storage medium of claim 16, wherein using the temporal information comprises:
combining the second fields for the second frame and respective temporal information into the first information; and
combining the second fields for the third frame and respective temporal information into the second information.

19. The non-transitory computer-readable storage medium of claim 18, further operable for:
converting the second fields for the second frame and respective temporal information, the first fields, and the second fields for the third frame and respective temporal information to the feature space.

20. An apparatus comprising:
one or more computer processors; and
a computer-readable storage medium comprising instructions for controlling the one or more computer processors to be operable for:
receiving a video including interlaced frames, wherein the interlaced frames include a first frame with first fields from original frames of the video, a second frame and a third frame with second fields from original frames of the video;
analyzing the second fields for the second frame to determine first information and the second fields for the third frame to determine second information, wherein the first information and the second information are for estimated second fields for the first frame in an image space;
converting the first fields, the first information, and the second information into first features, second features, and third features, respectively, in a feature space;

refining the first features, the second features, and the third features in the feature space to determine refined first features, refined second features, and refined third features;

outputting a prediction for the estimated second fields for the first frame based on the refined first features, refined second features, and refined third features; and using the prediction to generate a first frame with the first fields and estimated second fields.

* * * * *